Patented Feb. 1, 1927.

1,616,292

UNITED STATES PATENT OFFICE.

KARL FRIEDRICH WILHELM, OF STRALSUND, GERMANY.

PROCESS FOR EXTRACTING FATTY ACIDS FROM OILS AND FATS.

No Drawing. Application filed July 7, 1924, Serial No. 724,702, and in Germany December 24, 1923.

This invention relates to the process of extracting fatty acids from oils and fats and has for its object to render the process more effective.

The process of extracting fatty acids from oils and fats by means of ablutions with alcohol or similar substances which dissolve fatty acids is generally known, and several possibilities exist for its application. In applying the process, however, troublesome emulsions are forming which it has been found difficult to separate. Furthermore, larger or smaller quantities of neutral oil or fat adhere to the fatty acids thus extracted.

My invention eliminates these disadvantages and permits the decomposition of oil and fat into neutral oil or neutral fat on the one hand and into almost absolutely pure fatty acid on the other.

It has been proposed to extract fatty acids from oils and fats by means of dry ammonia gas, but this method of obtaining pure fatty acid requires more steps than the process claimed, which consists in applying a solution of water, alcohol and ammonia in one step.

The application of my process takes place as follows:

Ablution of oils and fats is effected by means of a solution of water, alcohol and ammonia. This solution possesses the property of dissolving fatty acids while it does not dissolve neutral oil or neutral fat. In carrying out this process corresponding quantities of water are added to the ammonia containing alcohol to produce the greatest possible difference between the specific gravity of the oil and that of the solution of water, alcohol and ammonia, and the oils and fats to be freed from fatty acid are treated with this solution in such a way that the latter thoroughly intermixes with the said oils and fats. In a state of rest the oil or fat will soon separate without any difficulty from the solution which has become saturated with ammonia soap, whereupon the said solution and its contents of ammonia soap are drawn off, the soap is decomposed and simultaneously the fatty acid separated from the solvent by distillation at a temperature of about 80° C. If traces of fatty acid are still remaining in the oils or fats after the application of this process, the latter is repeated until the last traces of fatty acid have been extracted from the oil or fat. The fatty acid is then separated from the alcohol-water-ammonia mixture by distillation, so that the remaining fatty acid discloses a purity degree of 95 and more per cent. On the other hand, the alcohol-water-ammonia mixture absorbed by the neutral oil or neutral fat is eliminated by heating the latter, and a perfectly neutral oil or fat is thus obtained.

The details of the operation of my process will now be shown by an example. To carry the process into effect, a solvent consisting of alcohol, water and ammonia is produced. The proportions of these ingredients may vary, but the solvent should always have a greater specific gravity than the fat or oil to be freed from acid.

For example, a solvent can be used consisting of 50 parts of water, 50 parts of alcohol and an admixture of approximately 1-3 parts of ammonia. By means of this solvent my process is applied as follows: For example, to one ton of cocoa-nut oil containing 10% fatty acid one and one-quarter to one and one-half ton of the above mixture of water, alcohol and ammonia is added, and the composition then heated up to approximately 75-80° C. When this point has been reached an emulsion will form which is necessary, to intermix the solvent thoroughly with the oil or fat to be freed from acid. At this moment the fatty acid contained in the crude oil or fat will be saponified by means of the ammonia while, at the same time, the alcohol will dissolve the soap thus formed. The entire mixture is then allowed to rest for a while during which time the oil or fat is freed from the fatty acid contained in the solvent and floats on top of the mixture. The solvent containing the fatty acid is drawn off below. After the solvent has become enriched enough the ammonia soap, which has been formed and dissolved in alcohol, is transformed into fatty acid by heating it and by removing the water, ammonia and alcohol by distillation. This process may be repeated once or several times according to the desired degree of deacidification of the oils or fats concerned. The alcohol, water and ammonia is then removed from this deacidified fat or oil, which is thus rendered absolutely neutral.

I claim:

The process of extracting fatty acids from oils and fats consisting in mixing them with a solution of alcohol, water and ammonia, whereby the fatty acids are neutralized and extracted as ammonia soaps dissolved in alcohol.

In testimony whereof I have affixed my signature.

KARL FRIEDRICH WILHELM.